S. D. OLSEN.
MACHINE FOR MAKING HOLLOW GLASSWARE.
APPLICATION FILED AUG. 20, 1919.

1,329,253.

Patented Jan. 27, 1920.
3 SHEETS—SHEET 1.

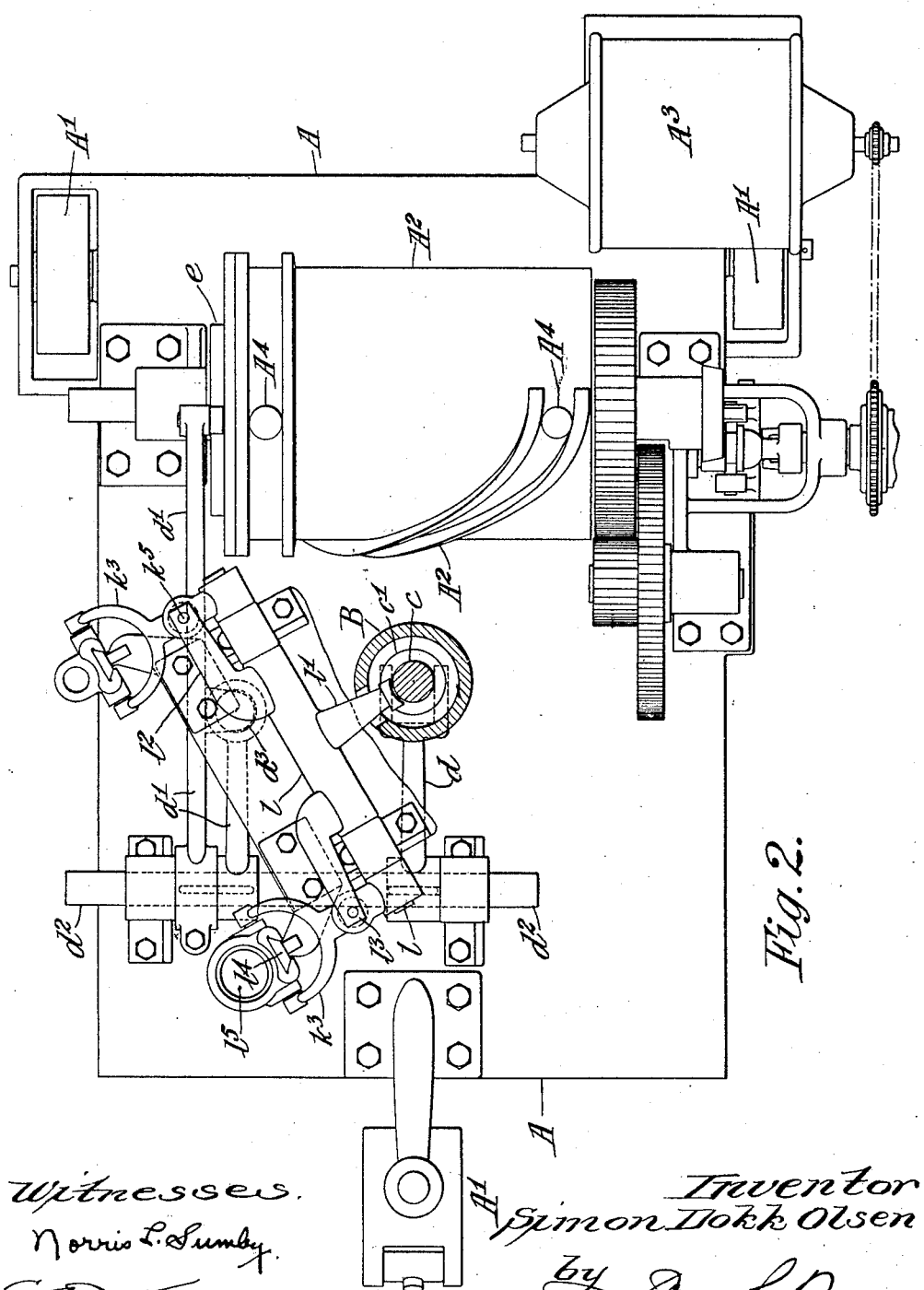

S. D. OLSEN.
MACHINE FOR MAKING HOLLOW GLASSWARE.
APPLICATION FILED AUG. 20, 1919.
1,329,253.
Patented Jan. 27, 1920.
3 SHEETS—SHEET 3.
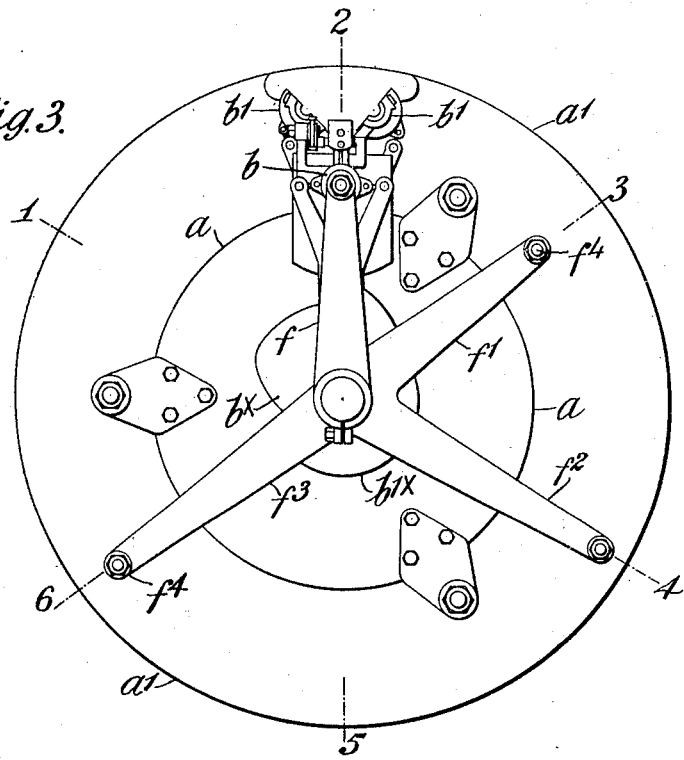
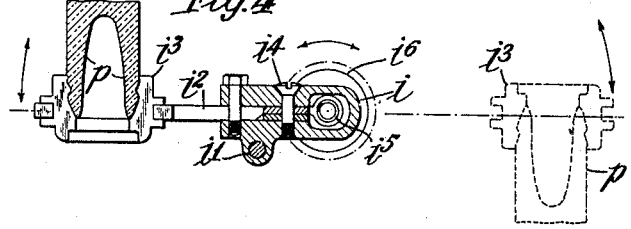

UNITED STATES PATENT OFFICE.

SIMON DOKK OLSEN, OF LEEDS, ENGLAND.

MACHINE FOR MAKING HOLLOW GLASSWARE.

1,329,253.     Specification of Letters Patent.     Patented Jan. 27, 1920.

Application filed August 20, 1919. Serial No. 318,806.

*To all whom it may concern:*

Be it known that I, SIMON DOKK OLSEN, a subject of the King of Norway, residing at 16 Camberley street, Dewsbury Road, Leeds, in the county of York, England, have invented certain new and useful Improvements in or Relating to Machines for Making Hollow Glassware, of which the following is a specification.

This invention has reference to machines for making glass-bottles and other hollow glass-ware, of the kind in which a blank or parison is formed in one mold and is blown to its final shape in another mold, a separate ring or mold being used to hold the neck of the parison or blank, and the molds (which are split and open book-wise) being arranged on rotary tables moved step-by-step, all substantially as in known types of glass-bottle machines.

The main object of the invention is to provide automatic means for effecting the transfer of the parison from the parison molds to the blow-molds of such rotary-table machines, so that all the operations or stages of the manufacture can be effected entirely automatically under the control of cams, without having to turn over the parison molds.

A feature of the invention consists in providing means for reversing the parison in its transit to the blow molds. To this end, a scissors or tong-like device carried by a rocking axle is employed to hold the neck-ring and is adapted to swing or tip over in a vertical plane from one position to the diametrically-opposite position. The former position corresponds to that in which the glass-blank or parison stands directly above the neck-ring, viz. is inverted, as it is when in the parison mold. The other position, into which the neck ring is swung or tipped over or reversed, is that in which the parison hangs down in an upright position, as when inside the blow-mold.

Another feature of the invention consists in constructing the neck-ring or mold in two parts fitted somewhat loosely in the jaws of the scissors or tong device. These jaws are mounted on a pivot at their opposite ends, and provided with a spring to keep them closed. The slight play or looseness in the fitting or mounting of the halves of the neck-ring, permits them (when brought together by the jaws,) to adjust themselves more accurately than if they were formed in one with the jaws. The jaws are opened by the act of opening the blow-mold as hereinafter described, so as to leave the finished bottle standing on the bottom block or support, which is of the ordinary kind.

In order that the invention may be clearly understood and readily carried into effect reference will now be had, by way of example, to the accompanying diagrammatic drawings in which:—

Fig. 2 is a plan of the under part thereof reduced.

Fig. 3 is a reduced plan of the upper part.

Fig. 4 is a detail section of the automatic transfer device.

Figure 1:
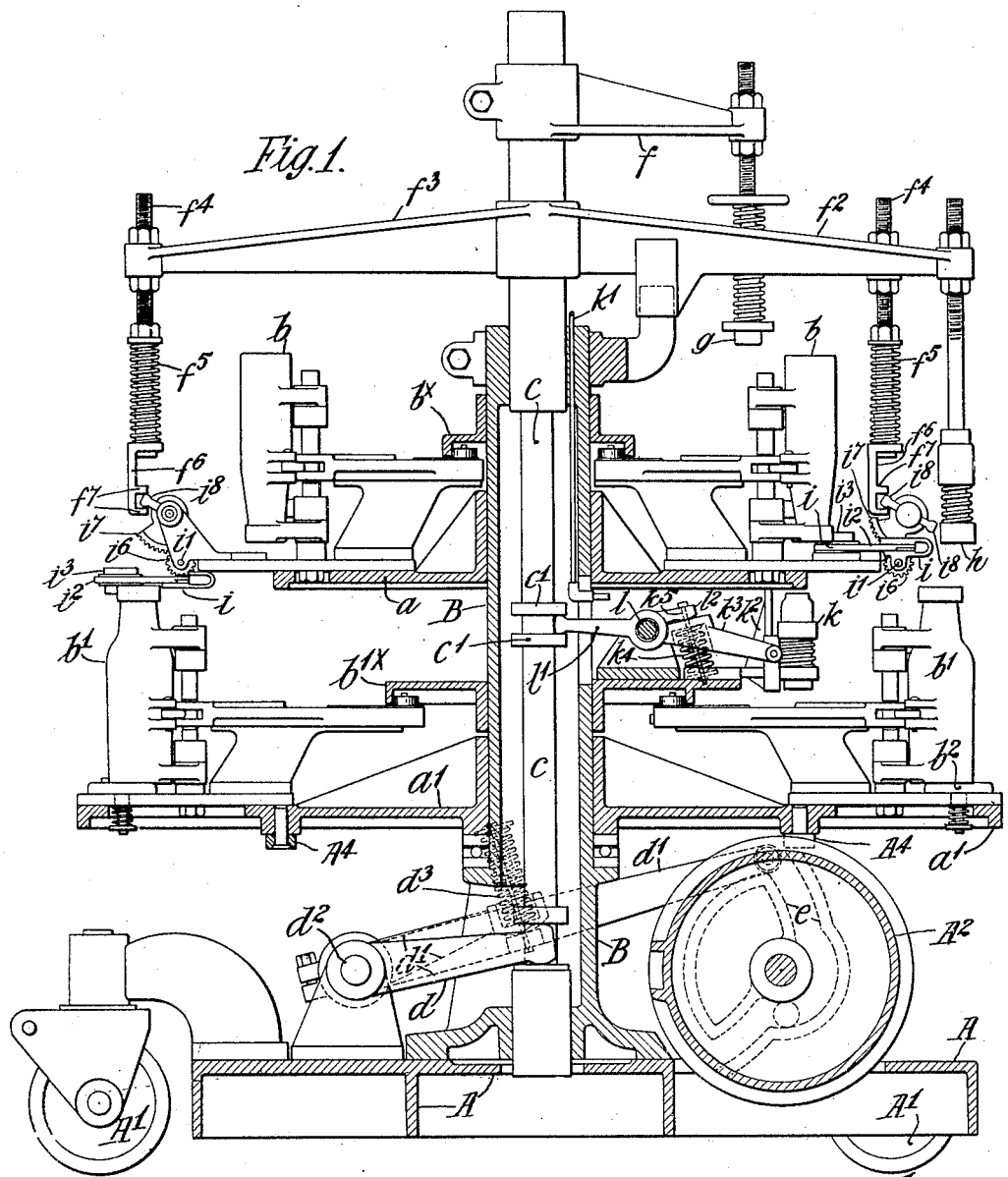
Figure 1 illustrates a vertical central section of the improved machine.

According to the example illustrated, the machine is provided with a base $A$ resting on rollers $A^1$ and provided with a hollow central pillar or standard $B$. Revolving around this latter are two superposed tables $a$ $a^1$ on which two sets of molds $b$ $b^1$ are mounted, the lower and larger table carrying the upright blow-molds $b^1$ while the upper or smaller one carries the inverted parison molds $b$.

The tables are rotated with a step-by-step motion by a cam barrel $A^2$ driven by an electric motor $A^3$ and engaging a set of studs provided with rollers $A^4$, each turn of the cam barrel corresponding to one step (say a sixth of a revolution) of the machine, that is to say of the tables $a$ $a^1$ in the well known manner. The molds are split and arranged to open bookwise in the ordinary way under the control respectively of fixed cams $b^x$ and $b^{1x}$. The machine is also provided with a vertical central shaft $c$ moved up and down by levers $d$, $d^1$, $d^1$ on an axle $d^2$ actuated by a cam $e$ on the end of $A^2$, as usual in machines of this kind. This shaft carries four radial arms, $f$ $f^1$ $f^2$ $f^3$ at the outer ends of two of which, viz. $f$ and $f^2$, are arranged a cover $g$ and a blow-cap $h$ of ordinary construction, serving respectively for the parison and blow-molds.

At the ends of the other two arms $f^1$ $f^3$ which are opposite each other, are adjustable screw rods $f^4$ each provided with an adjusting spring $f^5$ acting on a bracket $f^6$. This bracket has a pair of claws or projections $f^7$ for engaging and operating the tipping over or transfer device $i$ whereby the parison or blank is transferred from its mold to the corresponding blow-mold.

The corresponding molds $b$ $b^1$ of each pair or set, although at different heights are arranged on the same radial line, the rocking axle $i^1$ of the transfer device being midway between them.

The said tipping or transfer device has its tongs or jaws $i^2$ which carry the neck-ring $i^3$ hinged together (see Fig. 4) at $i^4$ and provided at $i^5$ with a spring tending to keep the jaws closed. The hinge of the tongs is carried in a bracket mounted (see Fig. 1) on the short axle $i^1$ provided with a pinion $i^6$ engaging a toothed segment $i^7$. On the axle of the segment are two short fingers or levers $i^8$ projecting from opposite sides, somewhat like the ends of a balance beam for instance.

When the parison $p$ (Fig. 4) is to be transferred, the parts come into such a position that one of the fingers or levers $i^8$ (the inner one on the right of Fig. 1) lies between a pair of the aforesaid claws $f^7$, so that it is moved by them as the central shaft $c$ moves downward. This motion rotates the toothed gear $i^8$ $i^7$ and swings or tips the arm $i^2$ of the transfer device over from one side to the other, so that the parison (which was being held by the neck-ring in the inverted position in which the parison mold had just opened and left it) is carried over and now hangs vertically downward (see dotted lines Fig. 4) in the proper upright position co-axial with the blow-mold ready for the latter to close on it.

After the machine has made a half revolution, the opposite finger or lever $i^8$ (the one which is now raised) comes between the other pair of claws $f^7$, and as the central shaft $c$ moves downward, it swings the neck-ring $i^8$ back into its previous position ready for the parison mold to close on it, prior to the molding of another parison. These actions go on regularly at each half revolution.

A blowing-plug $k$ supplied from an air-pipe $k^1$ is adapted to be inserted from below into the neck-ring $i^3$ to blow the glass to the shape of the parison mold. This blow-plug is carried by a vertical slide $k^2$ operated by a lever arm $k^3$. This lever is connected by a spring $k^4$ on a tie-rod $k^5$ with an arm $l^2$ on one end of a rock-shaft $l$, the parts $k^4$ $k^5$ forming a yielding or safety connection. This spindle in turn is operated by an arm $l^1$ in the middle thereof engaging between a pair of collars $c^1$ on the shaft $c$.

Another arm $l^3$ at the opposite end of the rock-shaft $l$ operates (see Fig. 2) a slide $l^4$ through a similar spring connection, this slide carrying a plate $l^5$ for closing the lower or neck end of the inverted parison mold when being filled.

A spring safety-connection $d^3$ is also provided between the two levers $d^1$ which transmit motion to the shaft $d^2$, the longer lever being loose on said shaft.

The general operations are carried out in stages, one stage for each step in the revolution of the machine. Taking one pair of molds as an example, the parison mold $b$ at position 1 (see Fig. 3) is closed at the bottom by the plate $l^5$ and is filled through its upper end, which is then closed at position 2, by the cap $g$ on the radial arm $f$. The blowing-plug $k$ simultaneously inserted into the bottom of the mold and extending through the neck-ring $i^3$, then blows the glass, and causes it to completely fill, and take the shape of the parison mold. The latter then opens, and at position 3 the parison, held in the neck-ring, is swung or tipped over by the device $i$ and the gears $i^6$ $i^7$ into the open blow-mold $b^1$. The latter then closes and its blow-cap $h$ at position 4 comes down on to the neck ring and finally blows the parison to the finished shape. The blow-mold then opens at position 5, so opening the neck ring as set forth below, and leaving the bottle upright on the base plate or block of the mold, ready for removal. At the next step (opposite 6) the neck-ring is swung back as above mentioned, so that it is ready for the parison mold to again close on it, prior to running in another charge of glass.

All these operations take place automatically under the control of cams, as the machine revolves step-by-step (say six steps to a revolution) and the central shaft moves up and down, and the latter movements control all the blowing and transferring actions.

The arrangement by which the blow mold when it opens, pulls open the neck-ring, comprises simply a pair of latches on the halves of the mold which engage corresponding projections on the halves of the neck-ring when the blow-mold closes and clasps the latter. Consequently when the blow-mold is opened the halves of the neck-ring are drawn apart, the scissors-like supports permitting of this readily.

I claim:—

1. In a rotary table machine for making hollow glass-ware the combination of inverted and upright molds, blowing mechanism coöperating therewith, devices for transferring the work from the inverted to the upright molds automatically, means for rotating the machine step by step, and means for actuating the transfer device and the blowing mechanism from one and the same moving part of the machine by a common upward and downward movement, substantially as described.

2. In a machine for making hollow glassware the combination of a set of parison molds, a set of blow-molds, a transfer device in the form of a scissors arrangement, a neck ring carried by said device, springs for closing said device, and means for causing the blow-mold to open the neck ring and release the finished bottle, substantially as described.

3. In a machine for making hollow glassware, the combination of superposed tables carrying parison and blow molds which open and close bookwise, a central shaft arranged to be moved upward and downward periodically, a transfer device to convey the parison from the parison molds to the blow-molds and to invert it during such transfer, reversing gears for operating the transfer device, radial arms extending from the central shaft, and carrying the blow-caps and the fingers for operating the reversing gear, and cam mechanism for rotating the tables and raising and lowering the central shaft, substantially as described.

4. In a machine for making hollow glassware, the combination of a hollow central pillar, a vertical shaft adapted to move up and down inside said pillar, an upper table revolving step-by-step around said pillar and carrying inverted parison molds, a lower and larger table also revolving around said pillar and carrying upright blow-molds, an automatic turn-over device for transferring the parison to the blow molds, and means for operating said turn-over transfer device by the upward and downward movement of the central pillar, substantially as described.

5. In a machine for making hollow glassware the combination of two superposed tables carrying respectively parison molds and blow molds, devices for transferring the parisons to the blow-molds automatically, a central shaft having an up and down movement, and means for operating said transfer devices as well as the blow-caps by the upward and downward movement of said shaft, substantially as described.

6. In a machine for making hollow glassware, the combination of a group of inverted parison molds, a group of upright blow molds, a central shaft and means for moving same up and down, transfer devices for removing the parison from the inverted molds and turning it over into the blow-molds, blow-caps coöperating with said molds for giving the necessary blowing operations, means for operating said blow-caps and transfer devices from the central shaft, means for rotating the two sets of molds step by step and for opening and closing them at the required times, substantially as described.

In testimony whereof I affix my signature.

SIMON DOKK OLSEN.